(12) United States Patent
Madden et al.

(10) Patent No.: US 8,542,234 B2
(45) Date of Patent: Sep. 24, 2013

(54) SYSTEM FOR ARRANGING A PLURALITY OF RELATIONAL NODES INTO GRAPHICAL LAYOUT FORM

(75) Inventors: Brendan Madden, Berkeley, CA (US); Karlis Freivalds, Garkaine (LV); Francois Bertault, Alameda, CA (US); Uli Foessmeier, Groebenzell (DE)

(73) Assignee: Tom Sawyer Software, Berkeley, CA (US)

( * ) Notice: Subject to any disclaimer, the term of this patent is extended or adjusted under 35 U.S.C. 154(b) by 19 days.

(21) Appl. No.: 13/278,047

(22) Filed: Oct. 20, 2011

(65) Prior Publication Data

US 2012/0268467 A1 Oct. 25, 2012

Related U.S. Application Data

(63) Continuation of application No. 11/166,975, filed on Jun. 24, 2005, now abandoned.

(51) Int. Cl.
*G06T 11/20* (2006.01)
*G06F 17/00* (2006.01)

(52) U.S. Cl.
USPC .......................... 345/440; 715/243; 715/247

(58) Field of Classification Search
CPC ............ H04L 12/2416; H04L 12/2458; H04L 12/2618; G06T 11/206
USPC ................ 345/635, 440; 715/200, 204, 206, 715/215, 243, 247, 713, 969, 246
See application file for complete search history.

(56) References Cited

U.S. PATENT DOCUMENTS

| | | | |
|---|---|---|---|
| 6,091,424 A * | 7/2000 | Madden et al. | 345/619 |
| 6,801,200 B1 * | 10/2004 | Prakriya et al. | 345/440 |
| 2008/0270946 A1 * | 10/2008 | Risch et al. | 715/848 |
| 2008/0276201 A1 * | 11/2008 | Risch et al. | 715/853 |

* cited by examiner

*Primary Examiner* — Wesner Sajous
(74) *Attorney, Agent, or Firm* — Useful Arts IP

(57) ABSTRACT

A system for arranging a plurality of nodes into graphical layout form partitions the nodes into a set of clusters from which a cluster graph is created. The cluster partitioning is based on the inter-nodal relationships, and cluster size depends on the number of nodes associated with each cluster. The clusters are laid out to avoid overlap, and cluster boundaries, within which nodes in a cluster are constrained, are generated. Nodes of each cluster as classified as either internal or boundary nodes, with boundary nodes being projected outward towards the boundary of the cluster. As an optional step, connection edges between nodes are routed to avoid overlap.

11 Claims, 9 Drawing Sheets

SYSTEM FOR ARRANGING A PLURALITY OF RELATIONAL NODES INTO GRAPHICAL LAYOUT FORM

RELATED APPLICATION

This application is a continuation of U.S. Ser. No. 11/166,975 of the same inventors filed Jun. 24, 2005 now abandoned, incorporated herein by reference.

BACKGROUND OF THE INVENTION

1. Field of the Invention

The invention is directed to a system for arranging a plurality of relational nodes into graphical layout form.

2. Description of the Related Art

Grouping nodes into graphical layout form is useful for providing an organizational view of the nodes in order to aid in conceptualizing relationships between the nodes. The nodes themselves can represent members of a structure, such as a computer network, or of an organization, such as a group of individuals whose behavior and role in the organization is being modeled, for example for law enforcement purposes. The nodes can also represent steps or sub-steps of a process, such as a manufacturing process or an information processing procedure.

BRIEF SUMMARY OF THE INVENTION

The system in accordance with the invention includes a method for generating a graphical layout for a plurality of nodes based on the presence of predetermined inter-nodal relationships. The method includes grouping nodes into one or more clusters, each containing one or more nodes, based on the inter-nodal relationships, and determining inter-cluster relationships from the inter-nodal relationships, determining a spatial layout of the clusters. Further, for at least a first cluster containing multiple nodes, the method includes determining a boundary prescribing a region in which the first cluster is contained, classifying the nodes in the first cluster into either internal or boundary nodes, projecting the boundary nodes to the boundary of the cluster, and determining a spatial layout of the internal nodes. Optionally, the connection edges representing the inter-nodal relationships can be routed in order to avoid overlaps. The system is applicable to groups of nodes comprising multiple clusters. Groups or sub-groups of clusters can be treated as "clusters of clusters," with the system of the invention being applied collectively to these clusters of clusters.

BRIEF DESCRIPTION OF THE SEVERAL VIEWS OF THE DRAWINGS

Many advantages of the present invention will be apparent to those skilled in the art with a reading of this specification in conjunction with the attached drawings, wherein like reference numerals are applied to like elements, and wherein.

DETAILED DESCRIPTION OF THE INVENTION

The system for arranging nodes into a prescribed graphical layout form in accordance with the invention will be described herein using as an illustrative and non-limiting example, the hypothetical of a group of twelve individual suspects (that is, nodes) being observed by law enforcement officials who are seeking to assess the suspects' role in a criminal organization. The relationships between the nodes upon which the arrangement is based in this example will be observed telephone calls between the suspects.

Figure 1A:
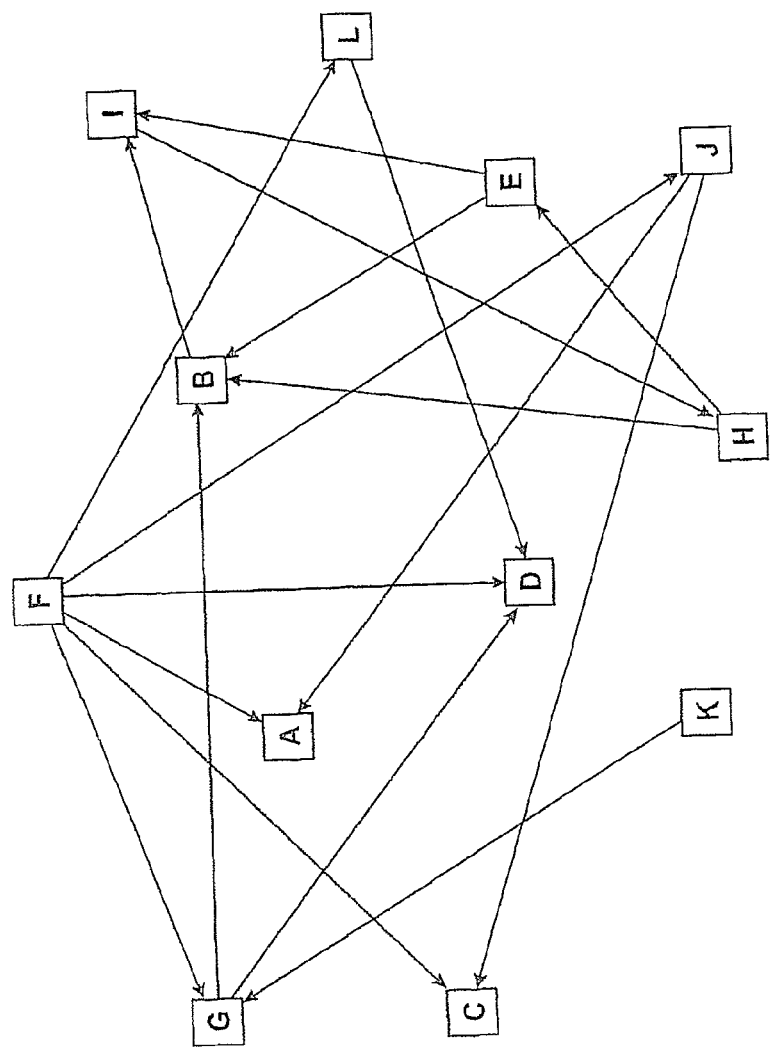
FIG. 1A is an arbitrary arrangement of nodes at the onset of the process in accordance with the invention.

The following starting conditions, illustrated graphically, in no particular arrangement in FIG. 1A, are used:

Number of suspects (nodes):
12
Identities of suspects:
A, B, C, D, E, F, G, H, I, J, K, L
Observed relationships (each relationship is represented as a set whose elements are the pair of individuals between which a telephone call occurred):
(B,I), (E,B), (E,I), (F,A), (F,C), (F,D), (F,G), (F,J), (F,L), (G,B), (G,D), (H,B), (H,E), (I,H), (J,A), (J,C), (K,G), (L,D)

Figure 2:
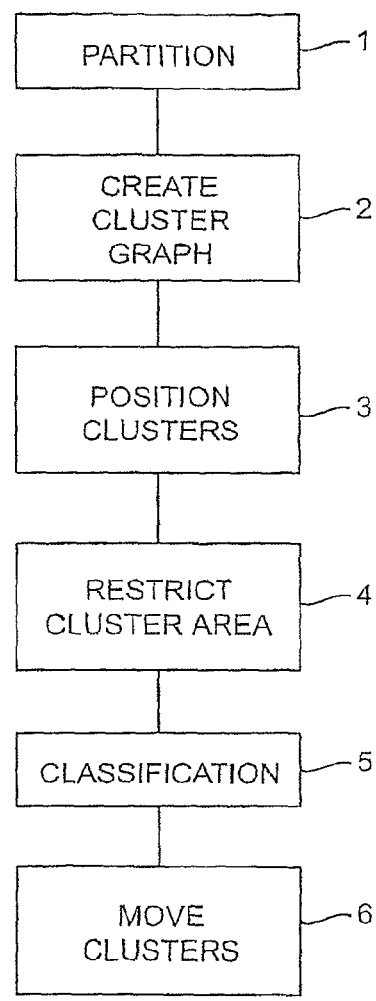
FIG. 2 is a flow diagram of a process in accordance with the invention.

FIG. 2 is a general overview of a process for arranging the nodes in graphical layout form in accordance with the invention. The first step (Step 1) is a partitioning step, wherein nodes are partitioned, or grouped, into a set of clusters based on their relationships to one another—that is, based on inter-nodal relationships. The partitioning step preferably uses a nondifferentiable optimization approach to ratio-cut partitioning as described in K. Freivalds, "A Nondifferentiable Optimization Approach To Ratio-Cut Partitioning," Univ. of Latvia, Institute of Mathematics and Computer Science, Riga, Latvia. This approach takes the inter-nodal connections into account, and relies on a dual-optimization process, with one optimization goal being to achieve cluster size parity—that is, generate clusters that are as close to one another in size as possible, with size being determined by the number of nodes constituting each cluster. The other optimization goal is inter-cluster connectivity minimization—that is, minimizing the number of connections between the different clusters. Step 1 thus consists of algorithms which partition the nodes into one or more clusters based on their relationships to one another, and is achieved using algorithms that seek to balance the aim of generating equally-populated clusters, with that of using as few connections between the clusters as possible. Applicable algorithms for this approach are described in the aforementioned Freivalds reference, incorporated herein by reference in its entirety. It will be appreciated that other algorithms are also possible for Step 1.

Applying partitioning Step 1 to the arbitrary arrangement of FIG. 1A alters that arrangement such that it can be represented by a pair of clusters $C_1$ and $C_2$ optimally accounting for the relationships (telephone calls) between the nodes (suspects). Cluster $C_1$ corresponds to the nodes A, C, D, F, G, J, K, L and cluster $C_2$ corresponds to the nodes B, E, H, I. The single inter-cluster connection reflects the relationship between nodes G and B.

Step 1 is followed by cluster graph creation Step 2 in FIG. 2. Cluster graph creation Step 2 entails determining the size of each cluster in the graphical representation, based on the number of nodes it contains as finally determined in Step 1. As explained above, partitioning Step 1 operates as an interplay, or balance, of optimization steps. The results of this optimization may or may not achieve equally-sized (or populated) clusters. The conditions for the cluster graph creation Step 2 are such that two clusters are connected by a connection edge if there exist two nodes, one in each cluster, which were connected in the original graph (FIG. 1A). Cluster size determination is based on the number of nodes contained in each cluster. Cluster size is proportional to this number. Each cluster is initially taken to be square in shape. The length of the sides of the square is:

$$radius*\sqrt{2}+spacing*2$$

where radius is roughly the sum of all sizes of nodes in a cluster ($\frac{1}{2}*sum_{node\ i\ in\ cluster}(height(i)+width(i))$), and where spacing is the maximum node size ($2*max_{node\ i\ in\ cluster}(height(i)+width(i))$). It will be appreciated that the formula for radius is actually more complicated than that used above for the sake of simplicity of explanation, but that it can be readily ascertained by those of ordinary skill in the art. Also, other formulas can be used without changing the nature of the invention.

In this example, clusters $C_1$ and $C_2$ will have different sizes, with cluster $C_1$ being the larger of the two, since cluster $C_1$ is associated with eight nodes (suspects A, C, D, F, G, J, K, L), while cluster $C_2$ is associated with four (suspects B, E, H, and I).

Figure 1B:
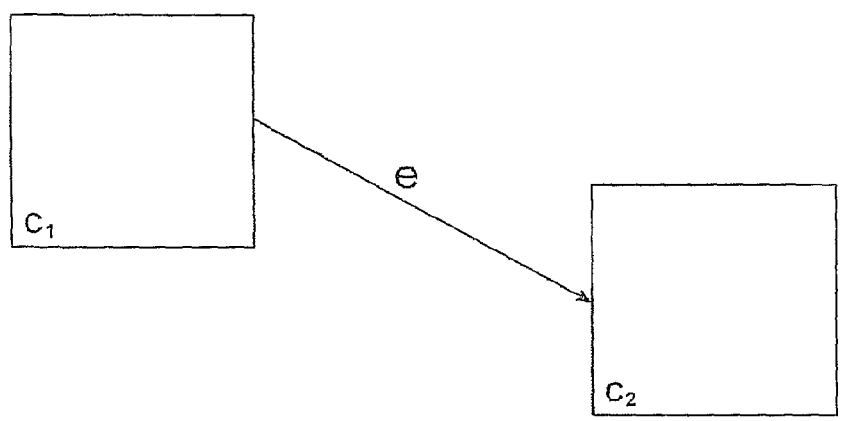
FIG. 1B is an arrangement diagramming the performance of cluster positioning Step 3.

As seen in FIG. 2, Step 2 is followed by cluster positioning Step 3, in which a spatial layout of the clusters is determined. Cluster positioning Step 3 is implemented using known algorithms such as spring-directed or force-directed algorithms, which are analogues of physical systems in which the nodes are characterized as representative of bodies that repel each other, for example through magnetic forces, while the edges connecting the nodes are characterized as elastic tethers (rubber bands) that pull them together. The algorithm first positions the bodies (nodes) randomly and then iteratively moves them in the direction of the sum of the forces acting on them, and continues until the movement becomes sufficiently small such that equilibrium is approached. Force-directed methods are well-known in the art, and other methods can be used for this purpose. Cluster positioning Step 3 provides a balanced, uncluttered look to the graphical layout, with non-overlapping clusters. The result of cluster positioning Step 3 is illustrated in FIG. 1B. Cluster positioning can also be performed as a recursive call to Steps 1-6 explained below, wherein the clusters are viewed as "clusters of clusters" and treated accordingly, with the clusters being constrained within boundaries and classified as boundary or internal clusters, and arranged accordingly.

Figure 1C:
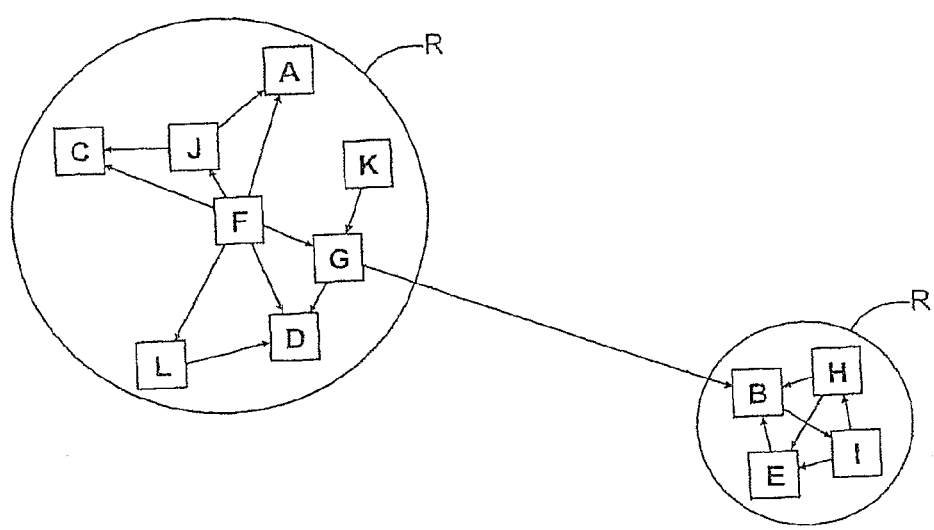
FIG. 1C is an arrangement diagramming the performance of initial positioning of nodes inside the cluster area Step 4.

Step 4 determines an initial positioning of nodes inside the cluster area. In Step 4, a region is created for each cluster, the region defining the position on the plane within which each cluster lies. In the preferred embodiment, the region (R) is circular, as shown in FIG. 1C. A force-directed or other algorithm taking into account the entire set of edges connecting nodes is then applied to adjust the placement of the nodes while respecting the boundary restrictions imposed by the regional determination of Step 4. The adjustment results in fewer edge crossing and reduces overlaps between clusters and inter-cluster edges.

In Step 5, node classification takes place. The nodes of each cluster are classified as either internal (I) or boundary (B) nodes. This is accomplished by projecting nodes onto the boundary (circle) of the region determined in Step 4, starting with the nodes that are further away from the center of the boundary, and considering only the nodes that can be projected without overlapping with other boundary nodes already projected onto the boundary. In addition, nodes that are incident (that is, related or connected) to one single other node are classified as boundary (B) nodes. The remaining nodes are classified as internal (I) nodes.

An assumption is made that all nodes of the cluster are located inside an area bounded by the circle, referred to as the "cluster circle." Nodes of the cluster are sorted according to their distance to the cluster circle. This is defined as the distance of the node's center to the closest point on the circle. An iteration through nodes of the cluster is performed, starting with the node closest to the cluster circle. For each node, it is checked whether, when moved to the closest point on the cluster circle, it would intersect with another node handled earlier in the loop. If not, the new node gets moved to that location on the cluster circle and becomes a boundary node. If yes, the node stays at its position inside the cluster and becomes an internal node. After all nodes are classified, each node with degree one is classified as a boundary node and moved to the closest point on the cluster circle, ignoring overlaps with other nodes in this case.

Figure 1D:
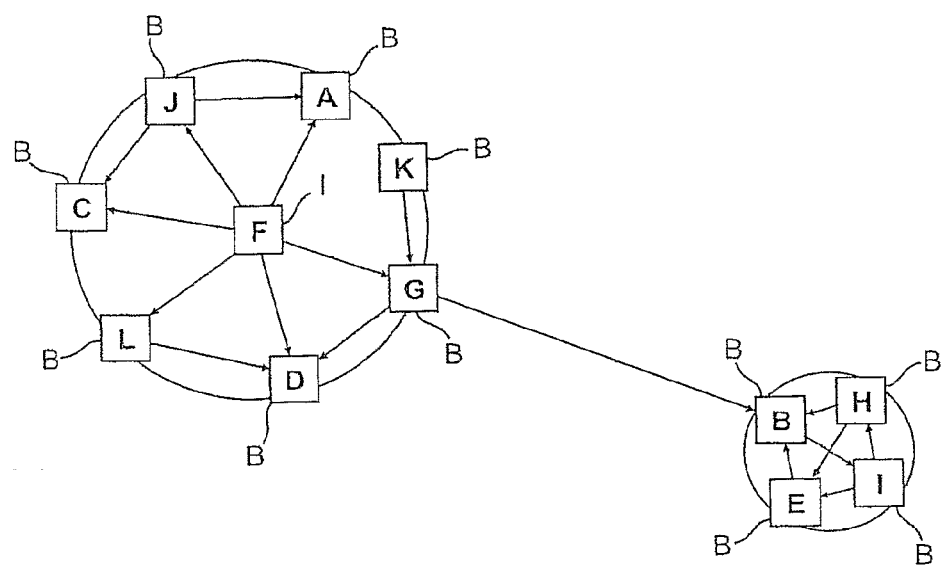
FIG. 1D is an arrangement diagramming the result of final positioning Step 6.

Finally, in Step 6, the boundary (B) nodes of each cluster are projected, or moved (if not already performed in Step 5), outward to the cluster boundary. The boundary nodes are separated from one another so as to be spread uniformly on the boundary. Their new boundary positions are then fixed, and a further force- or spring-directed or other algorithm is performed on the internal nodes in the cluster in order to better distribute the nodes in the cluster. The result of projection Step 6 is illustrated in FIG. 1D.

An optional step may be performed to route connection edges between nodes to avoid overlap.

The above procedures facilitate the conceptualization of the relationships of the nodes to one another. Thus, returning to the law enforcement example introduced above, it can be seen from FIG. 1D that there are effectively two groups of suspects, corresponding to clusters $C_1$ and $C_2$. In the $C_1$ group, suspect F appears to be the "ring-leader," as suspect F has the most telephone calls to other suspects in the group. The two groups are almost autonomous, with phone calls between suspect B and suspect G being the exclusive link between them.

It will be appreciated that for convenience and ease of conceptualization the system of the invention is described as implementing distinct Steps 1-6. However, it should be noted that these steps may in fact over-lap, be greater or less than six in number, and may each constitute one or more sub-steps. Further, the order of the steps may be different from that set forth above by way of example only.

As an alternative to the above approach, characterized as being non-incremental in nature, an incremental approach which allows changes to a layout without drastically altering its appearance can be taken. Such an incremental approach accommodates a user's comfort with an existing layout, whose appearance is not dramatically changed despite changes to the nodes and/or relationships. Such changes include adding new nodes or relationships, deleting existing nodes or relationships, and changing an existing layout (for example, by moving nodes to a different place).

In the incremental approach, the nondifferentiable optimization approach to ratio-cut partitioning in Step 1 is instead replaced by cluster determination based on existing node positions, so that nodes that are close together are placed into the same cluster, and nodes that are far apart are placed in different clusters. Further, when force-directed algorithms are used in the layout of the cluster graph, these are applied at existing node positions, rather than to randomized node positions. When the force-directed algorithms are applied in the classification of nodes (Internal vs. Boundary), the algorithms are initiated with the existing node positions rather than randomized node positions. If recursive calling is used, the recursive call is applied to the incremental version of the (circular) layout.

Figure 3A:
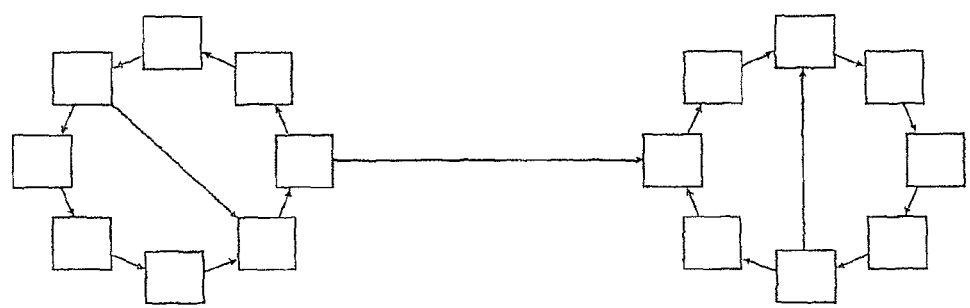
FIGS. 3A-3D are schematic diagrams of a non-incremental approach in accordance with the invention.
Figure 3B:
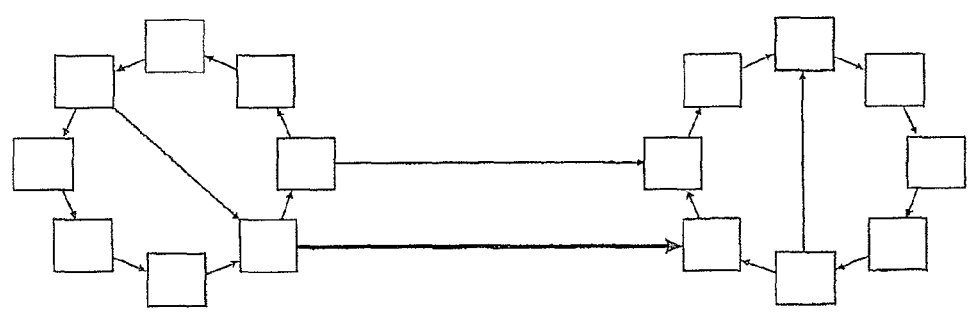
Figure 3C:
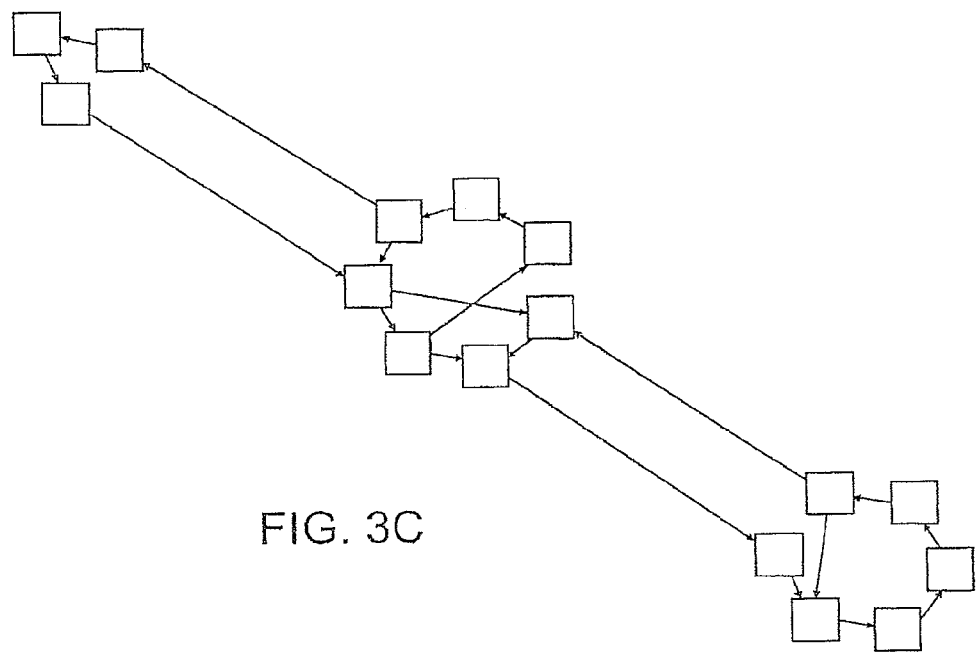
Figure 3D:
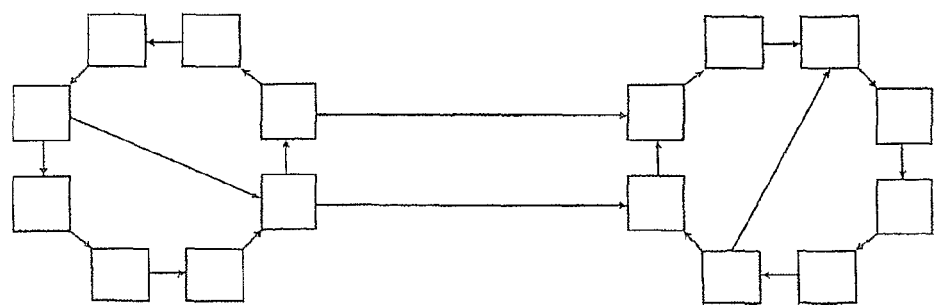

To illustrate the non-incremental approach, reference is first made to FIGS. 3A-3D. FIG. 3A shows an existing layout structure. The addition of another relationship, indicated by the thicker line connecting the two clusters in FIG. 3B, would, using the non-incremental approach, result in the layout depicted in FIG. 3C. By comparison, the incremental approach would yield the spatially similar layout of FIG. 3D, making the relatively minor change much more easily conceptualized.

The incremental clustering method is based on an algorithm that detects clusters from a circular-like drawing. In a circular drawing some nodes of a cluster are placed on a circle, some are placed inside a circle. Also, the user may place nodes close together to indicate that they should form a cluster.

The algorithm detects groups of nodes, where inside a group nodes are close together and the distance between groups is relatively large. Proximity graphs can be used to determine groups of nodes that are close together. Each connected component of a proximity graph defines a group of nodes. For a definition and discussion of proximity graphs, reference is made to J. W. Jaromczyk and Godfried T. Toussaint, "Relative Neighborhood Graphs And Their Relatives," In Proc. IEEE, pages 1502-1517, 1992.

Some proximity graphs are defined in the following:

Let $V=\{p1, \ldots pn\}$ be a set of n points in the plane. For each point p let Rp be the closest distance to any other point in the set, and let Cp be a circle of radius Rp centered at p.

Sphere-of-Influence Graph

The sphere-of-influence graph is a graph on V with an edge between points p and q if and only if the circles Cp and Cq intersect in at least two places.

Pruned Sphere-of-Influence Graph

The pruned sphere-of-influence graph has an edge between points p and q when the distance between the circles Cp and Cq is smaller than some threshold. The distance between two circles is defined as the distance between the centers minus the sum of the two circles' radii. The threshold is selected proportional to the sum of the circle radii.

Gabriel Graph

Denote d(p,q) the distance between points p and q. An edge (p,q) belongs to the Gabriel graph if $$d(p,q) \leq \min(\sqrt{d^2(p,s)+d^2(q,s)}) \text{ for each node } s).$$

Pruned Gabriel Graph

The pruned Gabriel graph has the same edges as the Gabriel graph except for edges that are longer than some threshold. The threshold is chosen to be proportional to the average edge length in the Gabriel graph.

Relative Neighborhood Graph

Denote d(p,q) the distance between points p and q. An edge (p,q) belongs to the relative neighborhood graph if $$d(p,q) \max(d(p,s),d(q,s)) \text{ for each node } s \text{ not equal to } p \text{ or } q).$$

Pruned Relative Neighborhood Graph

The pruned relative neighborhood graph has the same edges as the relative neighborhood graph except for edges that are longer than some threshold. The threshold is chosen to be proportional to the average edge length in the relative neighborhood graph.

The above are exemplary modes of carrying out the invention and are not intended to be limiting. It will be apparent to those of ordinary skill in the art that modifications thereto can be made without departure from the spirit and scope of the invention as set forth in the following claims.

What is claimed is:

1. A method for generating a graphical layout for a plurality of nodes based on the presence of predetermined inter-nodal relationships between the nodes, the method being computer-implemented using a computer comprising a processor and a computer memory, comprising:

within computer memory, grouping nodes into one or more clusters, each containing one or more nodes, based on the inter-nodal relationships;

within computer memory, determining inter-cluster relationships from the inter-nodal relationships;

within computer memory, determining a spatial layout of the clusters based on the determined inter-cluster relationships;

within computer memory, for each cluster containing multiple nodes, prior to determining positions for nodes, determining a fixed boundary for the cluster;

classifying the nodes in the cluster as either internal or boundary nodes;

projecting the boundary nodes to the boundary of the cluster and determining a spatial layout of the boundary nodes such that each boundary node abuts or straddles the boundary for the cluster; and determining a spatial layout of the internal nodes such that multiple internal nodes are laid out with reference to one another; and providing from computer memory a graphical representation of the plurality of nodes in accordance with the spatial layout.

2. The method of claim 1, wherein said grouping comprises: balancing a cluster size parity optimization operation with a cluster connectivity minimization operation, wherein said cluster size parity optimization operation comprises attempting to achieve clusters whose sizes are as close to one another as possible, and wherein said connectivity minimization operation comprises attempting to minimize the number of connections between clusters, each connection representing an inter-nodal relationship.

3. The method of claim 1, wherein determining a spatial layout of the clusters comprises using a spring-directed algorithm.

4. The method of claim 1, wherein determining a spatial layout of the clusters comprises using a force-directed algorithm.

5. The method of claim 1, wherein determining a spatial layout of the internal nodes comprises using a spring-directed algorithm.

6. The method of claim 1, wherein determining a spatial layout of the internal nodes comprises using a force-directed algorithm.

7. The method of claim 1, wherein the boundary is circular.

8. The method of claim 1, further comprising providing non-overlapping connection edges between nodes.

9. The method of claim 1, wherein determining a spatial layout of the clusters, classifying the nodes in the cluster as either internal or boundary nodes, and determining a spatial layout of the internal nodes are performed using existing node positions.

10. The method of claim 9, wherein a calculation of previously existing groups is performed using a proximity graph.

11. A non-transitory computer readable medium for generating a graphical layout for a plurality of nodes based on the presence of predetermined inter-nodal relationships between the nodes, comprising instructions for:
- grouping nodes into one or more clusters, each containing one or more nodes, based on the inter-nodal relationships;
- determining inter-cluster relationships from the inter-nodal relationships;
- determining a spatial layout of the clusters based on the determined inter-cluster relationships;
- for each cluster containing multiple nodes,
  - prior to determining positions for nodes, determining a fixed boundary for the cluster;
  - classifying the nodes in the cluster as either internal or boundary nodes;
  - projecting the boundary nodes to the boundary of the cluster and determining a spatial layout of the boundary nodes such that each boundary node abuts or straddles the boundary for the cluster; and
  - determining a spatial layout of the internal nodes such that multiple internal nodes are laid out with reference to one another; and
- providing a graphical representation of the plurality of nodes in accordance with the spatial layout.

* * * * *